United States Patent
Kim et al.

(10) Patent No.: US 10,249,874 B2
(45) Date of Patent: Apr. 2, 2019

(54) COMPOSITE NEGATIVE ACTIVE MATERIAL, NEGATIVE ELECTRODE INCLUDING COMPOSITE NEGATIVE ACTIVE MATERIAL, AND LITHIUM SECONDARY BATTERY INCLUDING NEGATIVE ELECTRODE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Guesung Kim, Suwon-si (KR); Jinsoo Mun, Seoul (KR); Heechul Jung, Gunpo-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 146 days.

(21) Appl. No.: 15/072,565

(22) Filed: Mar. 17, 2016

(65) Prior Publication Data

US 2017/0092940 A1    Mar. 30, 2017

(30) Foreign Application Priority Data

Sep. 25, 2015    (KR) .................. 10-2015-0137080

(51) Int. Cl.
*H01M 4/36* (2006.01)
*H01M 4/58* (2010.01)
(Continued)

(52) U.S. Cl.
CPC ......... *H01M 4/366* (2013.01); *H01M 4/0402* (2013.01); *H01M 4/0404* (2013.01); *H01M 4/0435* (2013.01); *H01M 4/0471* (2013.01); *H01M 4/134* (2013.01); *H01M 4/1395* (2013.01); *H01M 4/364* (2013.01); *H01M 4/38* (2013.01); *H01M 4/382* (2013.01); *H01M 4/386* (2013.01); *H01M 4/582* (2013.01); *H01M 4/587* (2013.01); *H01M 4/5825* (2013.01);
(Continued)

(58) Field of Classification Search
None
See application file for complete search history.

(56) References Cited

U.S. PATENT DOCUMENTS 8,753,545 B2    6/2014    Obrovac et al.
9,178,214 B2    11/2015    Mah et al.
(Continued)

FOREIGN PATENT DOCUMENTS

KR    1020130062105 A    6/2013

OTHER PUBLICATIONS

Li et al, Artificial Solid Electrolyte Interphase To Address the Electrochemical Degradation of Silicon Electrodes, 6 ACS Appl. Mater. Interfaces, 10083-10088 (2014).*
(Continued)

*Primary Examiner* — Yoshitoshi Takeuchi
(74) *Attorney, Agent, or Firm* — Cantor Colburn LLP (57) ABSTRACT

A composite negative active material including: a silicon-containing negative active material; and a non-metal doped metal phosphate, wherein the non-metal doped metal phosphate includes two or more metals. Also a negative electrode including the composite negative active material, and a lithium secondary battery including the negative electrode

15 Claims, 3 Drawing Sheets

(51) Int. Cl.
*H01M 4/04* (2006.01)
*H01M 4/134* (2010.01)
*H01M 4/1395* (2010.01)
*H01M 4/38* (2006.01)
*H01M 4/587* (2010.01)
*H01M 4/62* (2006.01)
*H01M 4/66* (2006.01)
*H01M 10/0525* (2010.01)
*H01M 10/0568* (2010.01)
*H01M 10/0569* (2010.01)
*H01M 10/0587* (2010.01)
*H01M 10/052* (2010.01)
*H01M 4/02* (2006.01)

(52) U.S. Cl.
CPC .......... *H01M 4/622* (2013.01); *H01M 4/625* (2013.01); *H01M 4/661* (2013.01); *H01M 10/052* (2013.01); *H01M 10/0525* (2013.01); *H01M 10/0568* (2013.01); *H01M 10/0569* (2013.01); *H01M 10/0587* (2013.01); *H01M 2004/027* (2013.01); *H01M 2220/20* (2013.01); *H01M 2220/30* (2013.01); *H01M 2300/004* (2013.01); *H01M 2300/0034* (2013.01)

(56) References Cited

U.S. PATENT DOCUMENTS

| | | |
|---|---|---|
| 2003/0170542 A1 | 9/2003 | Barker et al. |
| 2011/0117432 A1 | 5/2011 | Kay |
| 2011/0168550 A1* | 7/2011 | Wang ..................... H01M 4/13 204/290.12 |

OTHER PUBLICATIONS

Jalem et al, Lithium ion conduction in tavorite-type LiMXO4F (M—X: Al—P, Mg—S) candidate solid electrolyte materials, 262 Solid State Ionics 589-592 (2013).*

* cited by examiner

COMPOSITE NEGATIVE ACTIVE MATERIAL, NEGATIVE ELECTRODE INCLUDING COMPOSITE NEGATIVE ACTIVE MATERIAL, AND LITHIUM SECONDARY BATTERY INCLUDING NEGATIVE ELECTRODE

CROSS-REFERENCE TO RELATED APPLICATION

This application claims priority to and the benefit of Korean Patent Application No. 10-2015-0137080, filed on Sep. 25, 2015, in the Korean Intellectual Property Office, and all the benefits accruing therefrom under 35 U.S.C. § 119, the content of which is incorporated herein in its entirety by reference.

BACKGROUND

1. Field

This disclosure relates to a composite negative active material, a negative electrode including the composite negative active material, and a lithium secondary battery including the negative electrode.

2. Description of the Related Art

Graphite has a specific capacity of about 360 milliampere-hours per gram (mAh/g), whereas silicon has a specific capacity of about 3,600 mAh/g, which is about 10 times greater than that of graphite. Thus silicon is potentially a higher capacity negative active material for next generation batteries. However, currently available silicon materials degrade after charging and discharging. Thus there remains a need for an improved silicon negative active material.

SUMMARY

An exemplary embodiment includes a composite negative active material including a silicon-containing negative active material and a non-metal doped metal phosphate.

An exemplary embodiment includes a negative electrode including the composite negative active material.

An exemplary embodiment includes a lithium secondary battery including the negative electrode.

Additional aspects will be set forth in part in the description which follows and, in part, will be apparent from the description.

According to an exemplary embodiment, a composite negative active material includes: a silicon-containing negative active material; and a non-metal doped metal phosphate, wherein the non-metal doped metal phosphate includes two or more metals.

The silicon-containing negative active material may include at least one selected from elemental silicon (Si), $SiO_x$ (wherein $0<x<2$), a Si—C composite, and a Si alloy.

The Si alloy may include at least one selected from $Fe_3Si$, $Fe_2Si$, $Fe_5Si_3$, $FeSi$, $FeSi_2$, $FeSi_3$, $AlSi_2$, $Cu_5Si$, $Mg_2Si$, $NiSi$, $TiSi_2$, and $Si_7Ti_4Ni_4$.

A non-metal in the non-metal doped metal phosphate may include at least one selected from fluorine (F), sulfur (S), nitrogen (N), and boron (B).

The non-metal doped metal phosphate may be represented by Formula 1:

$$M_xMePO_4E_y$$ Formula 1 wherein, in Formula 1,

M may be one selected from lithium (Li), sodium (Na), rubidium (Rb), lanthanum (La), strontium (Sr), and radium (Ra), Me may be at least one selected from aluminum (Al), titanium (Ti), magnesium (Mg), zinc (Zn), vanadium (V), manganese (Mn), gallium (Ga), chromium (Cr), iron (Fe), rhodium (Rh), nickel (Ni), indium (In), and cobalt (Co), E may be at least one selected from F, S, N, and B, M may be different from Me, and $0.01 \leq x < 2$ and $0.01 \leq y < 2$.

The amount of the non-metal doped metal phosphate may be less than 10 parts by weight, based on 100 parts by weight of the silicon-containing negative active material.

According to an exemplary embodiment, a negative electrode may include the composite negative active material.

The negative electrode may further include an additional negative active material.

According to an exemplary embodiment, a lithium secondary battery may include the negative electrode.

Also disclosed is a composite negative active material including: a core including silicon; and a coating layer on the core, wherein the coating layer includes a non-metal doped metal phosphate represented by Formula 1

$$M_xMePO_4E_y$$ Formula 1 wherein, in Formula 1, M is at least one selected from lithium, sodium, rubidium, lanthanum, strontium, and radium, Me is at least one selected from aluminum, titanium, magnesium, zinc, vanadium, manganese, gallium, chromium, iron, rhodium, nickel, indium, and cobalt, E is a non-metal dopant and is at least one selected from F, S, N, and B, M is different from Me, and $0.01 \leq x < 2$ and $0.01 \leq y < 2$.

Also disclosed is a method of preparing a composite negative active material, the method including: providing silicon-containing negative active material; contacting the silicon-containing negative active material with a solution of a non-metal doped phosphate to form a coated negative active material; drying the coated negative active material to form a dried negative active material; and heat-treating the dried negative active material to prepare the composite negative active material.

Also disclosed is a composite negative active material including:
a silicon-containing negative active material; and
a non-metal doped metal phosphate represented by the formula $$Li_xAlPO_4F_y$$

wherein $0.01 \leq x < 2$ and $0.01 \leq y < 2$.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. "Or" means "and/or."

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

Hereinafter, with reference to attached drawings, a composite negative active material, a negative electrode, and a lithium secondary battery according to an embodiment are disclosed in further detail. The disclosed composite negative active material comprises a silicon-containing negative active material and a non-metal doped metal phosphate. The negative electrode comprises the composite negative active material. The lithium secondary battery comprises the negative electrode.

While not wanting to be bound by theory, it is understood that when a negative active material comprising silicon is charged and discharged, the binding force between active materials may be reduced, silicon particles themselves may be cracked, and a solid electrolyte interface (SEI) layer is continuously formed and reformed due to recurring expansion and shrinkage of the negative active material particles during charge and discharge. The recurring expansion and shrinkage of the negative active material particles, and the resulting changes in the particles, is understood to be the cause of lifespan deterioration. Therefore, in order to commercialize silicon in lithium secondary batteries, suppression of an irreversible reaction due to charging and discharging to thereby improve the poor lifespan characteristics of the silicon materials so that they are at least comparable to graphite is desired.

A composite negative active material according to an embodiment may include a silicon-containing negative active material and a non-metal doped metal phosphate. The non-metal doped metal phosphate may include two or more metals. The non-metal doped metal phosphate may be in the form of a coating layer disposed on a core comprising, e.g., consisting of, the silicon-containing negative active material.

As used herein, "a composite negative active material" refers to a mixture or a composite of the silicon-containing negative active material and the non-metal doped metal phosphate or the silicon-containing negative active material in which the non-metal doped metal phosphate is added thereto or coated thereon. As used herein, "a composite" refers to a material which includes two or more constituent materials with different physical or chemical properties such that, when combined, the composite has characteristics which are different from the individual components. Within the composite, the individual components remain separate and distinct within the finished structure.

Lithium ions may be alloyed or dealloyed, or intercalated into or deintercalated from, the silicon-containing negative active material.

The silicon-containing negative active material may include at least one selected from elemental silicon (Si) (i.e., solid silicon metalloid), $SiO_x$ (wherein 0<x<2), a Si—C composite, and a Si alloy.

The Si alloy may include at least one selected from $Fe_3Si$, $Fe_2Si$, $Fe_5Si_3$, FeSi, $FeSi_2$, $FeSi_3$, $AlSi_2$, $Cu_5Si$, $Mg_2Si$, NiSi, $TiSi_2$, and $Si_7T_4Ni_4$.

The silicon-containing negative active material may have a core-shell structure or a single-body structure, e.g., a particle comprising only a core, e.g., a particle having a single composition.

The composite negative active material may further be treated with a selective etchant.

When the composite negative active material is treated with a selective etchant, a selected portion of the silicon-containing negative active material, e.g., only a Si alloy, may be selectively etched and removed, forming a pore therein. The selective etchant may be at least one selected from a buffered oxide etchant (BOE), HF, HCl, and NaOH.

Accordingly, the silicon-containing negative active material may be porous. In this case, the porosity of the silicon-containing negative active material may be in a range of about 1% to about 10%, about 2% to about 8%, or about 5%, based on a total volume of the silicon-containing negative active material.

The non-metal doped metal phosphate may suppress an irreversible reaction of the silicon-containing negative active material. While not wanting to be bound by theory, it is understood that the irreversible reaction may be caused by recurring expansion and shrinkage caused by repeated charging and discharging. Thus, the composite negative active material may have improved electrochemical characteristics. In greater detail, the non-metal doped metal phosphate may suppress the reduction of the binding force between the silicon-containing negative active materials, the cracking of the silicon-containing negative active material, and the continuous reformation of solid electrolyte interface (SEI) layer due to recurring expansion and shrinkage of the negative active material particles during charge and discharge.

A non-metal in the non-metal doped metal phosphate may include at least one selected from fluorine (F), sulfur (S), nitrogen (N), and boron (B).

The non-metal doped metal phosphate may be represented by Formula 1:

$$M_xMePO_4E_y$$ Formula 1 wherein, in Formula 1,

M may be at least one selected from lithium (Li), sodium (Na), rubidium (Rb), lanthanum (La), strontium (Sr), and radium (Ra), Me may be at least one selected from aluminum (Al), titanium (Ti), magnesium (Mg), zinc (Zn), vanadium (V), manganese (Mn), gallium (Ga), chromium (Cr), iron (Fe), rhodium (Rh), nickel (Ni), indium (In), and cobalt (Co), E may be at least one selected from F, S, N, and B, M may be different from Me, and 0.01≤x<2 and 0.01≤y<2.

In an embodiment, M may be one selected from lithium (Li), sodium (Na), rubidium (Rb), lanthanum (La), strontium (Sr), and radium (Ra). In a preferred embodiment M is Li or Na. Li is specifically mentioned.

In yet another embodiment, Me may be one selected from aluminum (Al), titanium (Ti), magnesium (Mg), zinc (Zn), vanadium (V), manganese (Mn), gallium (Ga), chromium (Cr), iron (Fe), rhodium (Rh), nickel (Ni), indium (In), and cobalt (Co). In a preferred embodiment Me is Al or Mg. Al is specifically mentioned. Also, an embodiment in which M is different from Me is specifically mentioned.

In an embodiment, E is F. Also, x may be in accordance with the inequality 0.05≤x<1.8, or 0.1≤x<1.5. Also, y may be in accordance with the inequality 0.05≤y<1.8, or 0.1≤y<1.5.

In an preferred embodiment, the non-metal doped phosphate is represented by the formula $$Li_xAlPO_4F_y$$

wherein 0.01≤x<2 and 0.01≤y<2.

The amount of the non-metal doped metal phosphate may be less than 10 parts by weight, based on 100 parts by weight of the silicon-containing negative active material. When the amount of the non-metal doped metal phosphate, based on 100 parts by weight of the silicon-containing negative active material, is about 10 parts by weight or more, the amount of the silicon-containing negative active material is decreased, and thus a capacity of the composite negative active material is reduced, also lifespan characteristics of the composite negative active material can be reduced. For example, the amount of the non-metal doped metal phosphate may be in a range of greater than about 0 part by weight to less than 10 parts by weight, about 0.1 part by weight to about 8 parts by weight, or about 1 part by weight to about 6 parts by weight, based on 100 parts by weight of the silicon-containing negative active material.

Figure 1:
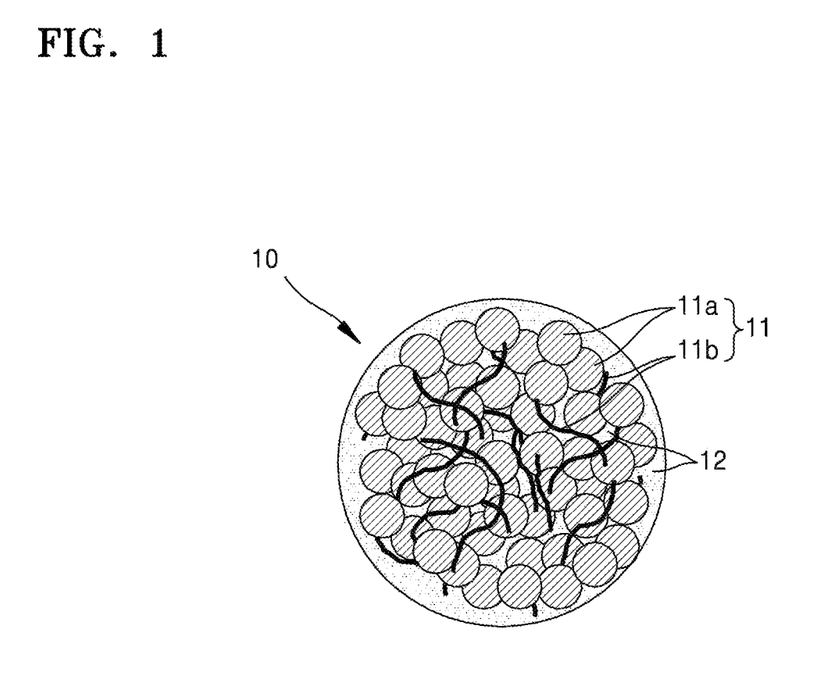
FIG. 1 is a schematic view illustrating an embodiment of a composite negative active material.

FIG. 1 is a schematic view illustrating an embodiment of the composite negative active material 10.

Referring to FIG. 1, the composite negative active material 10 according to an exemplary embodiment may include a silicon-containing negative active material 11 and a non-metal doped metal phosphate 12.

The silicon-containing negative active material 11 may comprise silicon and a carbon, and may be a composite of silicon 11a and a carbon 11b.

The non-metal doped metal phosphate 12 may be disposed to completely surround the silicon-containing negative active material 11, and/or to fill pores present inside the silicon-containing negative active material 11.

Hereinafter a method of preparing a composite negative active material, according to an exemplary embodiment, will be further described.

The method of preparing a composite negative active material may include a first Operation 1 for coating a silicon-containing negative active material with a solution, e.g., an aqueous solution, of a non-metal doped metal phosphate, a second Operation 2 for drying the coated silicon-containing negative active material, and a third Operation 3 for heat treating the dried silicon-containing negative active material under a nitrogen atmosphere.

The drying in Operation 2 may be performed at a temperature range of about 80° C. to about 200° C. for about 5 hours to about 24 hours, e.g., at about 85° C. to about 190° C., about 90° C. to about 180° C., or about 100° C. to about 170° C., for about 6 hours to about 20 hours, about 7 hours to about 18 hours, or about 8 hours to about 16 hours.

The heat treating in Operation 3 may be performed at a temperature range of about 400° C. to about 1,000° C., e.g., about 500° C. to about 800° C., or 600° C., for about 1 hour to about 24 hours, e.g., 12 hours.

Hereinafter a method of preparing a negative electrode, according to an exemplary embodiment, will be further described.

The negative electrode may include the above-mentioned composite negative active material.

The negative electrode may further include an additional negative active material, which is suitable for use in a lithium secondary battery, in addition to the above-mentioned composite negative active material.

Examples of the additional negative active material may include a carbonaceous material, which is capable of intercalation and deintercalation of lithium ions, e.g., carbon nanotubes (CNT), carbon nanofibers, graphene, graphite, or carbon black; lithium metal; an alloy of lithium metal; and a silicon oxide-containing material.

The negative electrode may additionally include a binder and/or a conductive agent in addition to the composite negative active material disclosed above and the additional negative active material, if present.

The binder may facilitate binding between components of the negative electrode, such as between the composite negative active material, the additional negative active material, and the conductive agent, and binding of the negative electrode to a current collector. Examples of the binder may include at least one selected from polyacrylic acid (PAA), polyvinylidene difluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, and a copolymer thereof.

The binder may include lithium ions.

The amount of the binder may be in a range of about 1 part by weight to about 20 parts by weight, for example, in a range of about 2 parts by weight to about 7 parts by weight, based on 100 parts by weight of a total weight of the composite negative active material and the additional negative active material if present. When the amount of the binder is in the range above, e.g., about 1 part by weight to about 20 parts by weight, based on 100 parts by weight of a total weight of the composite negative active material and the additional negative active material if present, the binding force of the negative electrode to the current collector may be suitably strong.

The conductive agent is not particularly limited as long as the conductive agent provides suitable electrical conductivity and does not induce an undesirable chemical change in the lithium secondary battery including the conductive agent.

The conductive agent may include, for example, at least one selected from a carbonaceous conductive agent, such as at least one selected from carbon black, carbon fiber, and graphite, which may be identical to or different from the graphite that may be used as the additional negative active material. The carbon black may be, for example, at least one selected from acetylene black, Ketjen black, Super P carbon, channel black, furnace black, lamp black, and thermal black. Examples of the graphite may include natural graphite and artificial graphite.

The negative electrode may additionally include an additional conductive agent in addition to the carbonaceous conductive agent described above.

The additional conductive agent may be selected from an electrically conductive fiber, e.g., at least one selected from a metal fiber, a fluorocarbon powder, and a metal powder, e.g., aluminum powder or nickel powder; a conductive whisker, e.g., a zinc oxide or a potassium titanate whisker; and a polyphenylene derivative.

The amount of the conductive agent may be in a range of about 0.5 part by weight to about 10 parts by weight, for example, in a range of about 0.01 part by weight to about 5 parts by weight, based on 100 parts by weight of a total weight of the composite negative active material and the additional negative active material, if present. When the amount of the conductive agent is within the range above, e.g., about 0.5 part by weight to about 10 parts by weight, a negative electrode having excellent ion conductivity may be obtained.

The negative electrode may be prepared, for example, by the following method.

First, the composite negative active material according to an embodiment, the additional negative active material, if present, the binder, a solvent, the carbonaceous conductive agent, and/or the other conductive agent may be mixed to prepare a composition for forming a negative active material layer.

Then, a negative electrode current collector may be coated with the composition for forming a negative active material layer and dried to thereby manufacture a negative electrode.

The thickness of the negative electrode current collector may be in a range of about 3 micrometers (μm) to about 500 μm. A material for the negative electrode current collector is not particularly limited as long as the material has suitable electrical conductivity while not causing an undesirable chemical change in the lithium secondary battery including the material. Examples of the material for the negative electrode current collector may include at least one selected from copper, stainless steel, aluminum, nickel, titanium, and a heat-treated carbon. In an embodiment, the negative electrode current collector may comprise at least one selected from a surface treated copper or a surface treated stainless steel, wherein the surface-treatment provides a layer of at least one selected from carbon, nickel, titanium, silver, and an aluminum-cadmium alloy on the copper or stainless steel. Also, similar to a positive electrode current collector, a texture may be provided on a surface of the negative electrode current collector to enhance a binding force of the negative active material to the negative electrode current collector. The negative electrode current collector may be used in any suitable form, including films, sheets, foils, nets, porous structures, foams, and non-woven fabrics.

Examples of the solvent include, but are not limited to, at least one selected from N-methylpyrrolidone (NMP), acetone, and water. The amount of the solvent may be in a range of about 1 part to about 50 parts by weight, based on 100 parts by weight of the total weight of the negative active material. When the amount of the solvent is within the above described range, forming an active material layer may be facilitated.

A lithium secondary battery according to an embodiment includes the above-mentioned negative electrode.

Figure 2:
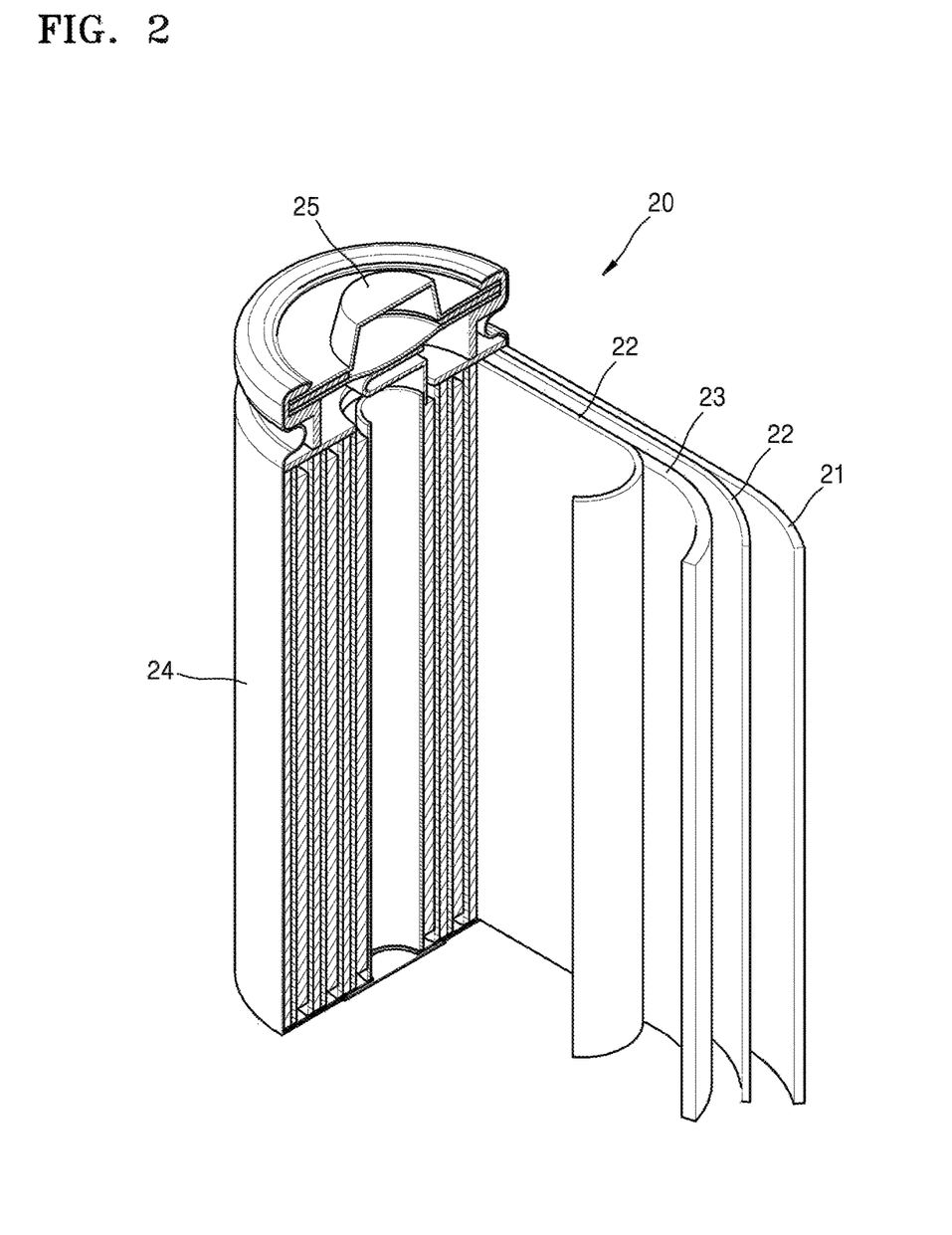
FIG. 2 is a schematic view illustrating an embodiment of a lithium secondary battery.

FIG. 2 is a schematic view illustrating an embodiment of a lithium secondary battery 20.

Referring to FIG. 2, the lithium secondary battery 20 may include a positive electrode 23, a negative electrode 21, and a separator 22.

The positive electrode 23, the negative electrode 21, and the separator 22 may be wound or folded and be accommodated in a battery case 24. Then, an electrolyte (not shown) may be injected to the battery case 24, and a cap assembly 25 may seal the battery case 24, thereby manufacturing the lithium secondary battery 20. The battery case 24 may be a coin type, a rectangular type, or a thin-film type. For example, the lithium secondary battery 20 may be a large thin-film type battery.

The lithium secondary battery 20 may have excellent lifespan characteristics.

Hereinafter a method of manufacturing a lithium secondary battery, according to an exemplary embodiment, will be disclosed in further detail.

First, a negative electrode may be manufactured based on the method described above.

A positive electrode may then be manufactured by a method similar with the method of manufacturing a negative electrode. For example, a lithium transition metal oxide, a binder, a conductive agent, and a solvent may be mixed to prepare a composition for forming a positive active material layer. Then, a positive electrode current collector may be coated with the composition for forming a positive active material layer and dried to thereby manufacture a positive electrode.

The types and the amounts of the binder, the conductive agent, and the solvent used to prepare the composition for forming a positive active material layer may be the same as those for preparing the composition for forming a negative active material layer.

The lithium transition metal oxide may be at least one selected from $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0\leq Y<1$), $LiMn_{2-z}Ni_zO_4$, $LiMn_{2-z}Co_zO_4$ (wherein $0<Z<2$), $LiCoPO_4$, and $LiFePO_4$.

The thickness of the positive electrode current collector may be in a range of about 3 µm to about 500 µm. A material for the positive electrode current collector is not particularly limited as long as the material has sufficient electrical conductivity and does not induce an undesirable chemical change in the lithium secondary battery including the material. Examples of the material may include at least one selected from stainless steel, aluminum, nickel, titanium, and heat-treated carbon. The aluminum or stainless steel may be surface-treated with at least one selected from carbon, nickel, titanium, and silver. In addition, the positive electrode current collector may be processed to have a texture on a surface thereof to enhance a binding force of the positive active material to the positive electrode current collector, and may be used in any suitable form, including films, sheets, foils, nets, porous structures, foams, and non-woven fabrics.

The lithium secondary battery may be manufactured by disposing a separator between the positive electrode and the negative electrode and supplying an organic liquid electrolyte thereto.

The lithium secondary battery may be manufactured by, for example, sequentially stacking the negative electrode, the separator, and the positive electrode; winding or folding the stacked structure; enclosing the wound or folded structure in a coin-type or rectangular battery case or a pouch; and then injecting the organic liquid electrolyte to the battery case or the pouch.

A pore diameter of the separator may be in a range of about 0.01 µm to about 10 µm, and a thickness of the separator may be in a range of about 5 µm to about 300 µm. In particular, the separator may include, for example, an olefin-based polymer, such as polypropylene or polyethylene; or a sheet or non-woven fabric formed of glass fibers.

The organic liquid electrolyte may be prepared by dissolving a lithium salt in an organic solvent.

The organic solvent may be at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, and dimethyl ether.

The lithium salt may be at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$, wherein x and y are natural numbers, LiCl, and LiI.

In a lithium secondary battery according to another embodiment, an organic solid electrolyte and/or an inorganic solid electrolyte may be used in combination with the organic liquid electrolyte. When the organic solid electrolyte and/or the inorganic solid electrolyte are used, the organic solid electrolyte and/or inorganic solid electrolyte may serve as a separator in some cases, and thus, the separator described above may be omitted if desired.

Examples of the organic solid electrolyte may include at least one selected from a polyethylene derivative, a polyethylene oxide derivative, a polypropylene oxide derivative, a phosphoric ester polymer, a polyester sulfide, a polyvinyl alcohol, and a polyvinylidene difluoride.

Examples of the inorganic solid electrolyte may include at least one selected from a lithium nitride, a lithium halide, and a lithium sulfide, such as at least one selected from $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium secondary battery may be used as a power source in a mobile device, e.g., a mobile phone, a personal digital assistant (PDA), and a portable multimedia player (PMP); a power source for driving a motor in a high-output hybrid automobile or an electric vehicle; a power source in a flexible display device, e.g., e-ink, e-paper, a flexible liquid crystal display device (LCD), and a flexible organic light-emitting display device (OLED); and a micro battery for a power source in an integrated circuit device on a printed circuit board (PCB).

The composite negative active material, negative electrode including composite negative active material, and lithium secondary battery including negative electrode will now be disclosed in greater detail with reference to the following examples. However, the following examples are for illustrative purposes only and shall not limit the scope of this disclosure.

EXAMPLES

Examples 1 to 4 and Comparative Examples 1 to 4

Preparation of Negative Active Material 10 grams (g) of a silicon-carbon (Si—C) composite including 70 parts by weight of silicon particles (available from Aldrich Co., Ltd., and having a diameter of about 50 nanometers (nm)) and 30 parts by weight of carbon particles was coated with a metal phosphate aqueous solution having a concentration of about 2 weight percent (wt %). Then, the coated Si—C composite was dried at a temperature of about 80° C. for about 6 hours. The dried Si—C composite was next heat treated at a temperature of about 600° C. for about 12 hours under a nitrogen atmosphere. As a result, a composite negative active material was prepared. The types of metal phosphates used in each Example and Comparative Example are shown in Table 1.

TABLE 1

|  | Example | | | | Comparative Example | | |
|---|---|---|---|---|---|---|---|
|  | 1 | 2 | 3 | 4 | 2 | 3 | 4 |
| Type of metal phosphate | $Li_{0.5}AlPO_4F$ | $Li_1AlPO_4F$ | $Li_{1.2}AlPO_4F$ | $Li_{0.5}AlPO_4F_2$ | $Al_2O_3$ | $AlPO_4$ | $AlPO_4F$ |

Comparative Example 1

Preparation of Negative Active Material

A Si—C composite including 70 parts by weight of silicon particles (available from Aldrich Co., Ltd., and having a diameter of about 50 nm) and 30 parts by weight of carbon particles was used as a negative active material.
Manufacture of Negative Electrode 89 parts by weight of the negative active material, 1 part by weight of a conductive agent (Ketchen black EC-600JD), and 10 parts by weight of a binder solution, which is a 4 volume % lithium-polyacrylic acid (Li-PAA) solution prepared by dissolving PAA (available from Aldrich Co., Ltd., PAA) in water to obtain an aqueous PAA solution and adding LiOH to the aqueous PAA solution, were mixed together to prepare a slurry for forming a negative active material layer. Then, the slurry for forming a negative active material layer was coated on a copper thin film, which is a negative electrode current collector and having a thickness of about 15 micrometers (μm), by using a doctor blade to have a thickness of about 100 μm. The coated copper thin film was primary-dried at a temperature of about 80° C., secondary dried at a temperature of about 120° C. under a vacuum atmosphere, and then was roll-pressed to manufacture a negative electrode.
Manufacture of a Coin Half-Cell The negative electrode was then wound in a round shape to have a diameter of about 12 millimeters (mm), and lithium metal was used as a counter electrode, thereby completing the manufacture of a 2032 type coin half-cell. Here, a 1.3 molar (M) $LiPF_6$ solution was used as a liquid electrolyte that is dissolved in a mixed solvent, wherein the mixed solvent is a mixture of ethylene carbonate, diethylene carbonate, and fluoroethylene carbonate in a weight ratio of about 2:6:2.

Evaluation Example

Evaluation of Charge/Discharge Characteristics

Charge and discharge characteristics of the coin half-cells prepared in Examples 1 to 4 and Comparative Examples 1 to 4 were evaluated by using a charger and discharger (TOYO-3100, available from: TOYO SYSTEM Co., Ltd.). In greater detail, in the first formation process, each of the coin half-cells was charged at a C-rate of about 0.1 C (unit: mA/g) at room temperature of about 25° C. until a voltage of about 0.01 V was reached. Then, the each of the coin half-cells was discharged at a C-rate of about 0.1 C until a voltage of about 1.5 V was reached. Thereafter, the each of the coin half-cells was rested for about 10 minutes. In the following second formation process, the each of the coin half-cells was charged at a C-rate of about 0.5 C at a temperature of about 25° C. until a voltage of about 0.01 V was reached. Then, the each of the coin half-cells was discharged at a C-rate of about 0.5 C until a voltage of about 1.5 V was reached. Thereafter, the each of the coin half-cells was rested for about 10 minutes. Subsequently, in the first and the following charging and discharging cycles (n≥1), the each of the coin half-cells was charged at a C-rate of 1.0 C until a voltage of about 0.01 V was reached. Then the each of the coin half-cells was discharged at a C-rate of about 1.0 C until a voltage of about 0.01 V was reached. The charge and discharge cycle described above was repeated 100 times (that is, n=100). The letter "C" denotes a discharge rate, which is a value obtained by dividing the total capacity of a cell by the total discharge time of the cell.

Figure 3:
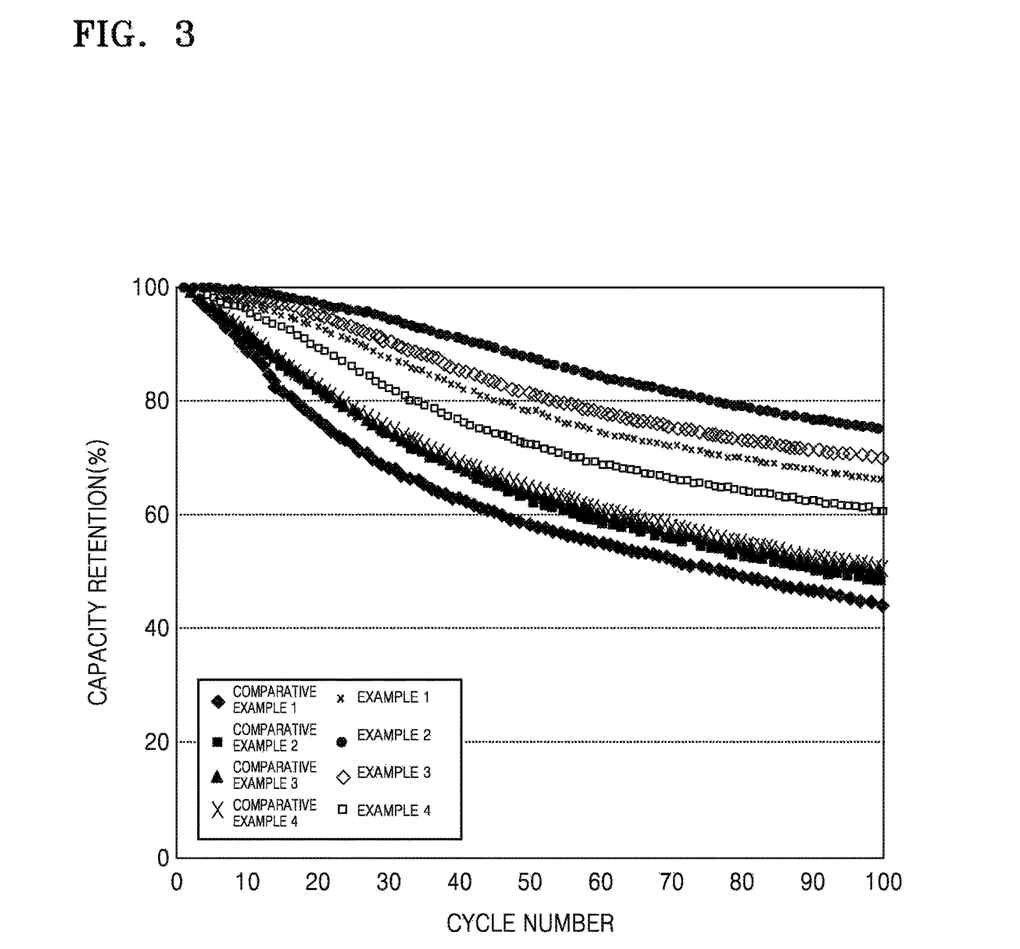
FIG. 3 is a graph of capacity retention (percent) versus number of cycles for coin half-cells manufactured in Examples 1 to 4 and Comparative Examples 1 to 4.

The cycle capacity retention of the each of the coin half-cells manufactured in Examples 1 to 4 and Comparative Examples 1 to 4 are shown in Table 2 and FIG. 3.

TABLE 2

|  | Example | | | | Comparative Example | | | |
|---|---|---|---|---|---|---|---|---|
|  | 1 | 2 | 3 | 4 | 1 | 2 | 3 | 4 |
| Capacity retention[*1] (%) (@ 100 cycles) | 66 | 75 | 69 | 60 | 44 | 49 | 50 | 52 |

In Table 2, "*1" indicates that Capacity retention (%) is determined according to the formula (discharge capacity when discharging a cell at a C-rate of about 1.0 C at the 100th cycle)/(discharge capacity when discharging a cell at a C-rate of about 1.0 C at the first cycle)×100%.

Referring to Table 2 and FIG. 3, it was found that the coin half-cells manufactured in Examples 1 to 4 have improved capacity retention, that is, long lifespan, according to the number of charging and discharging cycles compared to those of Comparative Examples 1 to 4.

A composite negative active material according to an embodiment may include a non-metal doped metal phosphate, which, while not wanting to be bound by theory, is understood to suppress an irreversible reaction of a silicon-containing negative active material during repeated charging and discharging. Thus, lifespan deterioration of a battery may be suppressed. Accordingly, a lithium secondary battery including the composite negative active material may have improved lifespan characteristics.

It should be understood that exemplary embodiments described herein should be considered in a descriptive sense only and not for purposes of limitation. Descriptions of features, advantages, or aspects within each exemplary embodiment should be considered as available for other similar features, advantages, or aspects in other exemplary embodiments.

While an exemplary embodiment has been described with reference to the figures, it will be understood by those of ordinary skill in the art that various changes in form and details may be made therein without departing from the spirit and scope as defined by the following claims.

What is claimed is:

1. A composite negative active material consisting of:
a silicon-containing negative active material; and
a non-metal doped metal phosphate, wherein the non-metal doped metal phosphate comprises two or more metals,
wherein an amount of the non-metal doped metal phosphate is less than 10 parts by weight, based on 100 parts by weight of the silicon-containing negative active material.

2. The composite negative active material of claim 1, wherein the silicon-containing negative active material comprises at least one selected from elemental silicon, $SiO_x$ wherein $0<x<2$, a Si—C composite, and a Si alloy.

3. The composite negative active material of claim 2, wherein the Si alloy comprises at least one selected from $Fe_3Si$, $Fe_2Si$, $Fe_5Si_3$, $FeSi$, $FeSi_2$, $FeSi_3$, $AlSi_2$, $Cu_5Si$, $Mg_2Si$, $NiSi$, $TiSi_2$, and $Si_7Ti_4Ni_4$.

4. The composite negative active material of claim 1, wherein a non-metal dopant in the non-metal doped metal phosphate comprises at least one selected from fluorine, sulfur, nitrogen, and boron.

5. The composite negative active material of claim 4, wherein the non-metal doped metal phosphate is represented by Formula 1:

$$M_xMePO_4E_y \qquad \text{Formula 1}$$

wherein, in Formula 1,

M is at least one selected from lithium, sodium, rubidium, lanthanum, strontium, and radium, Me is at least one selected from aluminum, titanium, magnesium, zinc, vanadium, manganese, gallium, chromium, iron, rhodium, nickel, indium, and cobalt, E is a non-metal dopant and is at least one selected from F, S, N, and B, M is different from Me, and $0.01 \leq x < 2$ and $0.01 \leq y < 2$.

6. A negative electrode comprising a composite negative active material according to claim 1.

7. A lithium secondary battery comprising the negative electrode according to claim 6.

8. The lithium secondary battery of claim 7, comprising:
a positive electrode;
the negative electrode;
a separator between the positive electrode and the negative electrode; and
an electrolyte.

9. A composite negative active material consisting of:
a core comprising silicon; and
a coating layer on the core, wherein the coating layer comprises a non-metal doped metal phosphate represented by Formula 1

$$M_xMePO_4E_y \qquad \text{Formula 1}$$

wherein, in Formula 1,

M is at least one selected from lithium, sodium, rubidium, lanthanum, strontium, and radium, Me is at least one selected from aluminum, titanium, magnesium, zinc, vanadium, manganese, gallium, chromium, iron, rhodium, nickel, indium, and cobalt, E is a non-metal dopant and is at least one selected from F, S, N, and B, M is different from Me, $0.01 \leq x < 2$, and $0.01 \leq y < 2$, wherein an amount of the coating layer is less than 10 parts by weight, based on 100 parts by weight of the core.

10. The composite negative active material of claim 9, wherein the composite negative active material comprises at least one selected from elemental silicon, $SiO_x$ wherein $0<x<2$, a Si—C composite, and a Si alloy.

11. A composite negative active material consisting of:
a silicon-containing negative active material comprising silicon; and
a non-metal doped metal phosphate represented by the formula $$Li_xAlPO_4F_y$$

wherein $0.01 \leq x < 2$ and $0.01 \leq y < 2$, wherein an amount of the non-metal doped metal phosphate is less than 10 parts by weight, based on 100 parts by weight of the silicon-containing negative active material.

12. The composite negative active material of claim 11, wherein the composite negative active material comprises at least one selected from elemental silicon, $SiO_x$ wherein $0<x<2$, a Si—C composite, and a Si alloy.

13. A method of preparing a composite negative active material, the method comprising:
providing a silicon-containing negative active material;
contacting the silicon-containing negative active material with a solution of a non-metal doped phosphate to form a coated negative active material;
drying the coated negative active material to form a dried negative active material; and
heat-treating the dried negative active material to prepare the composite negative active material,
wherein the composite negative active material consists of
a silicon-containing negative active material, and
a non-metal doped metal phosphate, wherein the non-metal doped metal phosphate comprises two or more metals,
wherein an amount of the non-metal doped metal phosphate is less than 10 parts by weight, based on 100 parts by weight of the silicon-containing negative active material.

14. The method of claim 13, wherein the silicon-containing negative active material comprises at least one selected from elemental silicon, $SiO_x$ wherein $0<x<2$, a Si—C composite, and a Si alloy.

15. The method of claim 13, wherein the heat-treating comprises heat-treating in a nitrogen atmosphere.

* * * * *